(12) United States Patent
Leiston

(10) Patent No.: US 9,999,178 B2
(45) Date of Patent: Jun. 19, 2018

(54) CAM FOR A WINDROW MERGER AND PICKUP HEAD HAVING A VARIABLE RADIUS

(71) Applicant: Oxbo International Corporation, Byron, NY (US)

(72) Inventor: Michael T Leiston, Rochester, NY (US)

(73) Assignee: Oxbo International Corporation, Byron, NY (US)

( * ) Notice: Subject to any disclaimer, the term of this patent is extended or adjusted under 35 U.S.C. 154(b) by 0 days. days.

(21) Appl. No.: 15/179,568

(22) Filed: Jun. 10, 2016

(65) Prior Publication Data

US 2016/0360703 A1    Dec. 15, 2016

Related U.S. Application Data

(60) Provisional application No. 62/175,038, filed on Jun. 12, 2015.

(51) Int. Cl.
    *A01D 34/00* (2006.01)
    *A01D 89/00* (2006.01)
    *A01D 84/00* (2006.01)

(52) U.S. Cl.
    CPC ........... *A01D 89/003* (2013.01); *A01D 84/00* (2013.01); *A01D 89/002* (2013.01)

(58) Field of Classification Search
    CPC ...... A01D 84/00; A01D 57/03; A01D 89/002; A01D 57/20; A01D 57/28; A01D 78/001;
(Continued)

(56) References Cited

U.S. PATENT DOCUMENTS

| 1,847,399 A | 3/1932 | Innes |
| 1,877,519 A | 9/1932 | MacGregor |

(Continued)

FOREIGN PATENT DOCUMENTS

| CA | 1 151 431 A | 8/1983 |
| DE | 90 14 438.4 U1 | 3/1991 |

(Continued)

OTHER PUBLICATIONS

310 Windrow Merger Parts & Operator's Manual, Publication No. 91192, Fourth Edition, Model Year 2003, 105 pages (Revised Mar. 1, 2006).

(Continued)

*Primary Examiner* — Arpad Fabian-Kovacs
(74) *Attorney, Agent, or Firm* — Merchant & Gould P.C.

(57) ABSTRACT

A windrow merger includes heads having cams that control the speed of the tines. The cam is configured with a section that slows the speed of the tines while passing a lower front portion of the path of rotation to lift material from the ground at lower speeds and therefore handles the material more gently at the point of pickup. The cam is configured to accelerate the tines at the point where the lifted material is propelled rearward from the pickup assembly. The merger heads also include a widened conveyor that is configured with an upper surface extending rearward and slightly downward to further evenly distribute material across the width of the conveyor. The heads are supported on skids that have a linkage connecting the skids at each end of the head with one of the skids having a mechanism that acts as a master to control the slave of the linked opposite skid.

18 Claims, 18 Drawing Sheets

(58) Field of Classification Search
CPC .. A01D 78/002; A01D 80/005; A01D 89/001; A01D 89/00; A01D 89/008
See application file for complete search history.

(56) References Cited

U.S. PATENT DOCUMENTS

| | | | |
|---|---|---|---|
| 1,877,770 A | 9/1932 | Larson | |
| 2,168,266 A | 8/1939 | McElwain | |
| 2,195,381 A | 3/1940 | Patterson | |
| 2,343,583 A | 3/1944 | Rogers | |
| 2,967,584 A | 1/1961 | Westerlund | |
| 3,177,638 A | 4/1965 | Johnson | |
| 3,190,392 A | 6/1965 | Ashton et al. | |
| 3,214,002 A | 10/1965 | Kirkpatrick et al. | |
| 3,240,005 A | 3/1966 | Rowse | |
| 3,404,517 A * | 10/1968 | Whitfied | A01D 29/00 460/128 |
| 3,468,107 A | 9/1969 | van der Lely | |
| 3,472,008 A * | 10/1969 | Hurlburt | A01D 57/03 56/1 |
| 3,508,627 A | 4/1970 | Lypko et al. | |
| 3,515,408 A | 6/1970 | Cagle | |
| 3,650,096 A | 3/1972 | Caldwell | |
| 3,656,578 A | 4/1972 | Hemken | |
| 3,695,015 A | 10/1972 | Twidale et al. | |
| 3,709,360 A | 1/1973 | Baker | |
| 3,714,766 A | 2/1973 | Ender et al. | |
| 3,751,888 A * | 8/1973 | James | A01D 57/03 56/12.4 |
| 3,754,383 A * | 8/1973 | Burrough | A01D 43/107 280/43 |
| 3,849,974 A * | 11/1974 | James | A01D 57/03 56/14.4 |
| 3,897,832 A | 8/1975 | Leedahl et al. | |
| 3,940,910 A * | 3/1976 | d'Acremont | A01D 43/10 56/14.4 |
| 4,042,044 A | 8/1977 | Honnold | |
| 4,058,170 A | 11/1977 | Ankenman et al. | |
| 4,081,946 A | 4/1978 | Ehrhart | |
| 4,131,293 A | 12/1978 | Kindle | |
| 4,184,314 A | 1/1980 | Hobbs | |
| 4,232,747 A | 11/1980 | Pfenninger et al. | |
| 4,245,716 A | 1/1981 | Rayfield | |
| 4,297,833 A * | 11/1981 | Gaeddert | A01D 89/002 56/364 |
| 4,346,909 A | 8/1982 | Hundeby | |
| 4,409,780 A | 10/1983 | Beougher et al. | |
| 4,487,004 A | 12/1984 | Kejr | |
| 4,512,140 A | 4/1985 | Blakeslee | |
| 4,573,309 A | 3/1986 | Patterson | |
| 4,621,487 A | 11/1986 | Urlacher et al. | |
| 4,658,572 A | 4/1987 | Honey et al. | |
| 4,700,784 A | 10/1987 | Wiebe et al. | |
| 4,738,092 A | 4/1988 | Jennings | |
| 4,768,334 A | 9/1988 | Honey et al. | |
| 4,793,129 A | 12/1988 | Ehrhart et al. | |
| 4,840,020 A | 6/1989 | Oka | |
| 4,896,732 A | 1/1990 | Stark | |
| 4,910,951 A | 3/1990 | Reilly et al. | |
| 4,932,196 A | 6/1990 | Schnittjer | |
| 4,981,013 A | 1/1991 | Underwood | |
| 5,031,394 A | 7/1991 | Honey | |
| 5,111,636 A | 5/1992 | Quirin | |
| 5,155,986 A | 10/1992 | Kelderman | |
| 5,177,944 A | 1/1993 | Finlay | |
| 5,203,154 A | 4/1993 | Lesher et al. | |
| 5,507,139 A | 4/1996 | Delperdang et al. | |
| 5,813,494 A | 9/1998 | Ulschmid et al. | |
| 5,848,523 A * | 12/1998 | Engel | A01D 89/008 100/88 |
| 5,893,262 A | 4/1999 | Harbach | |
| 5,911,625 A | 6/1999 | von Allwörden | |
| 5,956,934 A | 9/1999 | Wright et al. | |
| 5,964,077 A | 10/1999 | Guinn | |
| 5,987,861 A * | 11/1999 | Duncan | A01D 57/03 460/142 |
| 6,205,757 B1 | 3/2001 | Dow et al. | |
| 6,212,865 B1 | 4/2001 | Peeters et al. | |
| 6,347,686 B1 | 2/2002 | Hedley et al. | |
| 6,354,429 B2 | 3/2002 | Kuhlmann et al. | |
| 6,401,440 B1 | 6/2002 | Franet et al. | |
| 6,415,590 B1 | 7/2002 | Lohrentz | |
| 6,502,379 B1 * | 1/2003 | Snider | A01D 57/02 56/221 |
| 6,508,050 B1 | 1/2003 | Krone | |
| 6,591,598 B2 * | 7/2003 | Remillard | A01D 57/03 56/221 |
| 6,658,828 B2 | 12/2003 | Franet | |
| 6,688,093 B1 | 2/2004 | Franet et al. | |
| 6,758,031 B2 | 7/2004 | Franet et al. | |
| 6,775,969 B2 | 8/2004 | Wuebbels et al. | |
| 6,843,045 B2 * | 1/2005 | Bickel | A01D 57/03 56/14.4 |
| 6,862,873 B2 | 3/2005 | Franet | |
| 6,942,041 B1 | 9/2005 | Kraus et al. | |
| 7,310,929 B2 | 12/2007 | Dow et al. | |
| 7,543,433 B2 | 6/2009 | Hironimus | |
| 7,628,004 B2 | 12/2009 | Geiser | |
| 7,650,736 B1 | 1/2010 | Salley et al. | |
| 7,712,295 B2 | 5/2010 | Walter et al. | |
| 7,827,774 B2 | 11/2010 | Dow et al. | |
| 8,074,432 B2 | 12/2011 | Hironimus et al. | |
| 8,091,331 B2 | 1/2012 | Dow et al. | |
| 8,166,739 B2 | 5/2012 | Dow et al. | |
| 8,186,138 B2 | 5/2012 | Dow et al. | |
| 8,225,588 B2 | 7/2012 | Hironimus et al. | |
| 8,240,117 B1 * | 8/2012 | McClure | A01D 89/008 56/341 |
| 8,511,052 B2 | 8/2013 | Dow et al. | |
| 8,863,488 B2 | 10/2014 | Dow et al. | |
| 2003/0110752 A1 | 6/2003 | Dow | |
| 2004/0200203 A1 * | 10/2004 | Dow | A01B 73/02 56/375 |
| 2005/0126153 A1 | 6/2005 | Hironimus et al. | |
| 2005/0172598 A1 | 8/2005 | Billard | |
| 2006/0162308 A1 | 7/2006 | Dow et al. | |
| 2006/0248870 A1 | 11/2006 | Geiser | |
| 2006/0254238 A1 | 11/2006 | Walter et al. | |
| 2006/0254244 A1 | 11/2006 | Geiser | |
| 2009/0241503 A1 | 10/2009 | Babler et al. | |
| 2009/0320434 A1 | 12/2009 | Pourchet et al. | |
| 2010/0037584 A1 * | 2/2010 | Dow | A01B 73/02 56/376 |
| 2012/0247078 A1 * | 10/2012 | Landon | A01D 57/28 56/192 |

FOREIGN PATENT DOCUMENTS

| | | | | |
|---|---|---|---|---|
| DE | 43 41 610 A1 | 6/1995 | | |
| DE | 10 2006 059 797 A1 | 6/2008 | | |
| EP | 0 789 990 A1 | 8/1997 | | |
| EP | 0 827 684 A2 | 3/1998 | | |
| EP | 0 853 872 B1 | 3/2003 | | |
| FR | 2 663 189 A1 | 12/1991 | | |
| FR | 2 852 485 A1 | 9/2004 | | |
| GB | 2 194 422 A | 3/1988 | | |
| SU | 835359 B | 6/1981 | | |
| WO | WO-8706793 A1 * | 11/1987 | | A01D 84/00 |
| WO | WO 2004/085115 A2 | 10/2004 | | |

OTHER PUBLICATIONS

310 Windrow Merger Parts & Operator's Manual, Publication No. 91217, Second Edition, 44 pages (Jul. 2004).
310 Windrow Merger Parts & Operator's Manual, Publication No. 91244, Fourth Edition, Model Year 2005, 145 pages (Revised Mar. 1, 2006).
Carr, P. et al., "Barley Versus Oat: Which Makes the Superior Forage Crop," 2001 Annual Report, Agronomy Section, 3 pages (2001).
PhiBer Farm Show Magazine, vol. 23, Issue 2, p. 30 (1999).

(56) References Cited

OTHER PUBLICATIONS

Photo of John Orr Windrow Merger, 1 page.
Resource Magazine's Outstanding Innovations 2004 AE50, 28 pages (Jun./Jul. 2004).
Rowse Windrow Fluffer Pamphlet, 4 pages.
Shinners, K.J. et al., "Equipment to Rake and Merge Hay and Forage," http://www.uwex.edu/ces/forage/wfc/proceedings2003/equipment.htm, 6 pages (2003).
Snel schud-/harksysteem, Praktijk Mechanisatie, 3 pages (Jul. 21, 2000).
Srivastava, A. et al., Engineering Principles of Agricultural Machines, Chapter 8 Hay and Forage Harvesting, 84 pages (Jun. 1993).
Tri-Flex Mergers Operator's Manual, 44 pages (Jan. 15, 2015).
Complaint with Exhibits A-F, *Oxbo International Corp.* vs. *H&S Manufacturing Company, Inc.*, Civil Action No. 15-cv-292, 147 pages (May 15, 2015).
Answer to Plaintiff's Complaint and Counterclaims, *Oxbo International Corp.* vs. *H&S Manufacturing Company, Inc.*, Civil Action No. 15-cv-292-jdp, 11 pages (Sep. 14, 2015).
Oxbo's Preliminary Infringement Contentions, *Oxbo International Corp.* vs. *H&S Manufacturing Company, Inc.*, Civil Action No. 15-cv-292-jdp, 9 pages (Nov. 2, 2015).
Defendant's Preliminary Invalidity Contentions, *Oxbo International Corp.* vs. *H&S Manufacturing Company, Inc.*, Civil Action No. 15-cv-292-jdp, 54 pages (Jan. 8, 2016).
Expert Report of Ralph Shirley, *Oxbo International Corp.* vs. *H&S Manufacturing Company, Inc. et al.*, Civil Action No. 15-292-jdp, 25 pages (Apr. 15, 2016).
Expert Report of Dr. Daniel J. Undersander, *Oxbo International Corp.* vs. *H&S Manufacturing Company, Inc..* v. *H&S Manufacturing Company, Inc.* v. *Oxbo International Corp. and Kuhn North America, Inc.*, Civil Action No. 15-292-jdp, 145 pages (Apr. 15, 2016).
Exhibit 11 to Howe Declaration, Civil Action No. 15-cv-00292-jdp, 55 pages (Aug. 30, 2016).
Exhibit 14 to Howe Declaration, Civil Action No. 15-cv-00292-jdp, 21 pages (Aug. 30, 2016).
Opinion & Order, *Oxbo International Corporation.* vs. *H&S Manufacturing Company, Inc.*, Civil Action No. 15-cv-292-jdp, 60 pages (May 23, 2017).
Declaration of Ralph Shirley, P.E., CFEI, *H&S Manufacturing Company, Inc.* v. *Oxbo International Corporation*, Case No. IPR2016-00950, 69 pages (Apr. 15, 2016).
Patent Owner's Preliminary Response, Case No. IPR2016-00950, 83 pages (Aug. 3, 2016).
Expert Declaration of Jonathan Chaplin, Ph.D., *H&S Manufacturing Company, Inc.* v. *Oxbo International Corporation*, Case No. IPR2016-00950, 59 pages (Mar. 1, 2017).
Deposition of Jonathan Chaplin, Ph.D., *H&S Manufacturing Company, Inc.* vs. *Oxbo International Corporation*, Case No. IPR2016-00950, 62 pages (Apr. 10, 2017).
Declaration of Dr. Daniel J. Undersander, *H&S Manufacturing Company, Inc.* v. *Oxbo International Corporation*, Case No. IPR2016-00950, 92 pages (Apr. 13, 2016).
Patent Owner's Response, Case No. IPR2016-00950, 67 pages (Mar. 1, 2017).
Reply to Patent Owner's Response, Case No. IPR2016-00950, 35 pages (May 3, 2017).

\* cited by examiner

CAM FOR A WINDROW MERGER AND PICKUP HEAD HAVING A VARIABLE RADIUS

BACKGROUND OF THE INVENTION

Field of the Invention

The present invention relates to a windrow merger apparatus and a method of merging windrows, and in particular relates to a windrow merging apparatus with a head having cams that slow the tines during pick up and speed the tines when releasing material.

Description of the Prior Art

Devices for merging windrows in the field are well known to gather material such as cut hay, alfalfa and other crops that might be merged into windrows for further processing such as chopping and/or harvesting. Windrow mergers typically include one or more heads to move the material to a single row at one side of the merger. Such mergers typically include tines that rotate and pick up the material from the ground and throw it rearward onto aligned conveyors that convey the material laterally to form a windrow.

Although mergers generally perform in a satisfactory manner and provide satisfactory pickup and conveyance into windrows, for certain conditions, problems may occur. In order to pick up the material and propel it onto the conveyor, the tines must move at a sufficient speed to throw the material onto the conveyor belt. If the speed of the tines at the top of the rotation when the picked up material is propelled rearward is too slow, the material may simply fall off the tine or only be propelled to the front portion of the belt so that clumping may occur. However, if the speed is increased to pick up and propel wet or heavier material from the ground, the tines move quickly at the point of engagement and lifting from the ground. At these higher speeds at the point of engagement, the material tends to be propelled forward, making it more difficult to pick up. Higher engagement speeds may damage the material being picked up and lessen its nutritional value. Moreover, in order to avoid higher speeds, it may be necessary to advance the merger more slowly along the field, thereby decreasing capacity and performance.

To overcome such problems, it can be appreciated that it would be advantageous if the material could be picked up from the ground while the tines are moving at a relatively slow speed, while the tines move at a faster speed at the top of the rotation to propel the material more reliably rearward and spread out the material onto the front and rear areas of the belt. Moreover, it can be appreciated that if a wider belt could be utilized, the material may be spread out more evenly and avoid clumping. Furthermore, if the belt could be angled downward from front to rear, the material would generally fall away from the leading edge of the belt and naturally spread the material more evenly across the width of the belt. By loading the rear of the conveyor first, the front portion of the belt adjacent the pickup head remains open to allow the material to slide along the guards of the heads and onto the belt. Such a configuration would increase capacity, especially when combined with a rearward angled belt. The present invention addresses these as well as other problems associated with windrow mergers.

SUMMARY OF THE INVENTION

The present invention is directed to a windrow merger and in particular to a windrow merger having pickup and transfer assemblies with enhanced material pickup and dispersal for improved operation at higher speeds and capacities. The windrow merger includes a frame and one or more heads. The merger may be self-propelled or configured to be towed behind a tractor or other tow vehicle. There may be multiple heads that are laterally aligned to form a continuous pickup face to transport material continuously to either end of the aligned heads.

Each of the pickup and transfer heads includes a pickup assembly with rotating tines spaced along and about a periphery of the pickup assembly. The tines are spaced longitudinally transverse to a direction of travel and also spaced about a periphery of the pickup assembly. The tines rotate about an axis extending laterally relative to the direction of travel. Flexible guards arc around the front face of the pickup and transfer head and spaced apart so that tine rotate between adjacent guards.

Each of the heads also includes a conveyor belt to the rear of the pickup assembly that transports material laterally. A shroud is positioned at the rear of the belt and extends upward to direct material propelled against the shroud to fall back onto the belt. Moreover, the conveyor belt has an upper surface that is angled downward and rearward relative to the direction of travel and away from the pickup assembly. In one embodiment, the surface of the belt is angled downward at approximately 5 degrees.

The pickup assemblies include cams that change the speed of the tines as they rotate through various sections of the rotational path. The tines are mounted on bars, which connect via tabs to rollers engaging the cam. The tabs are adjustable so that the angle of the tines relative to the roller is adjustable. The cam includes portions that are spaced further from the axis of rotation so that rotational speed is slowed while the tines ride over the widening portions of the cams. Other sections have a reducing radius to the axis of rotation so that the rotational speed is relatively higher at these portions.

In one embodiment, the cam has an area of increasing radius proximate a forward lower portion of the pickup assembly so that the speed of the tines is slowed as the tines engage and pick up material from the ground. This provides for more gentle handling of the material. The cam also includes a reducing radius portion along the forward and upper portion of the path of rotation of the pickup assembly so that the speed of the tines increases through this section and is relatively fast to propel the material further rearward as the tines reach the top portion of the rotational path where the material is jettisoned from the tines. The additionally increased speed provides for propelling the material at a greater distance and spreads the material more evenly over a widened belt. In addition, the downward angled belt to the rear further disperses the material more evenly over the width of the conveyor belts. The slower pickup speeds while still propelling material more evenly over a widened belt minimizes clumping and allows for operating at greater speeds and increases capacity.

The merger heads also include a suspension system with a linkage connecting skids at opposite ends of each head in a master and slave relationship so that only a single hydraulic cylinder is required for a mechanism that controls both skids.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views.

DETAILED DESCRIPTION OF THE PREFERRED EMBODIMENT

Figure 1:
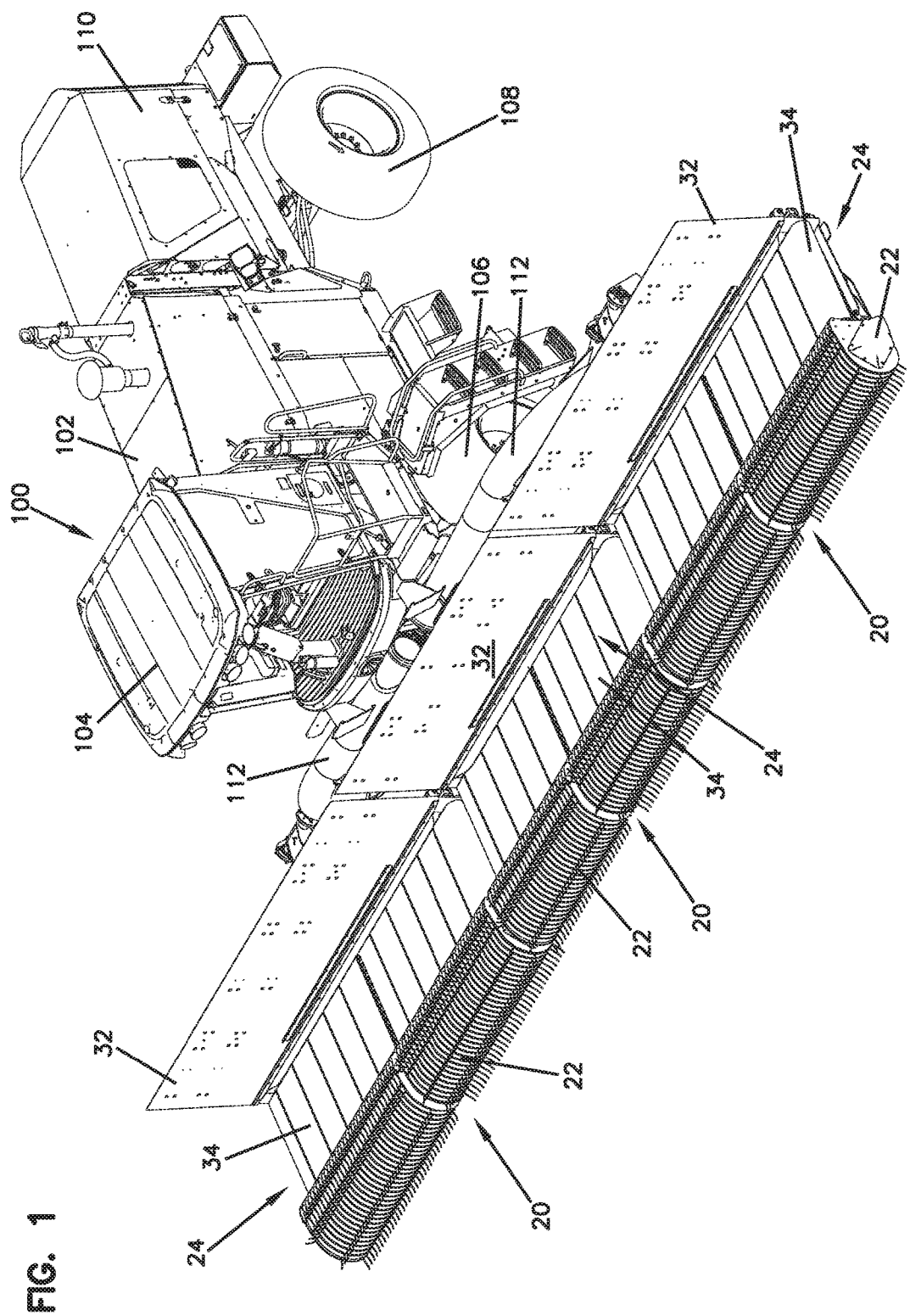
FIG. 1 is a perspective view of a first embodiment of a windrow merger according to the principles of the present invention.
Figure 2:
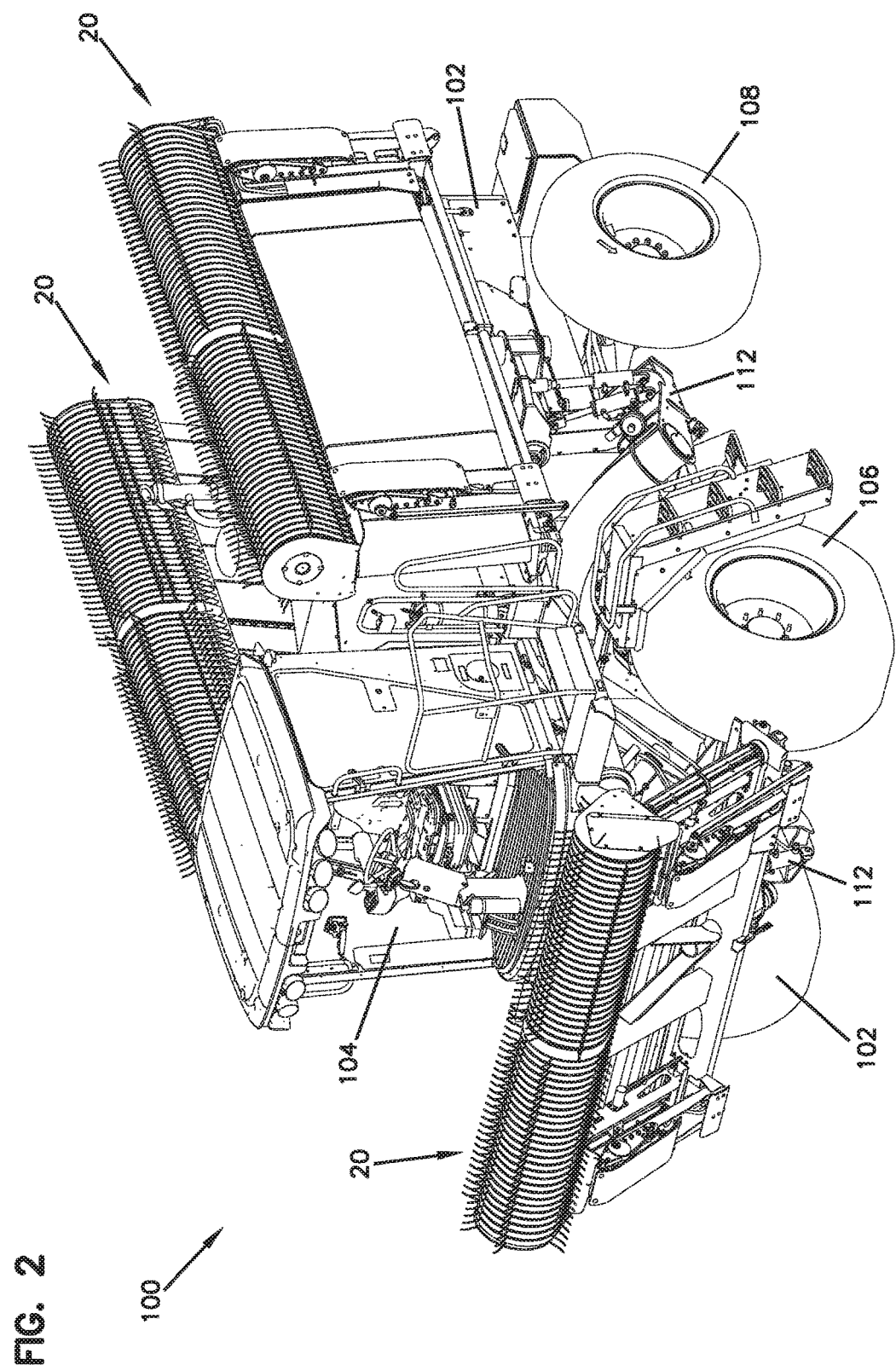
FIG. 2 is a perspective view of the windrow merger of FIG. 1 shown in a folded position.
Figure 3:
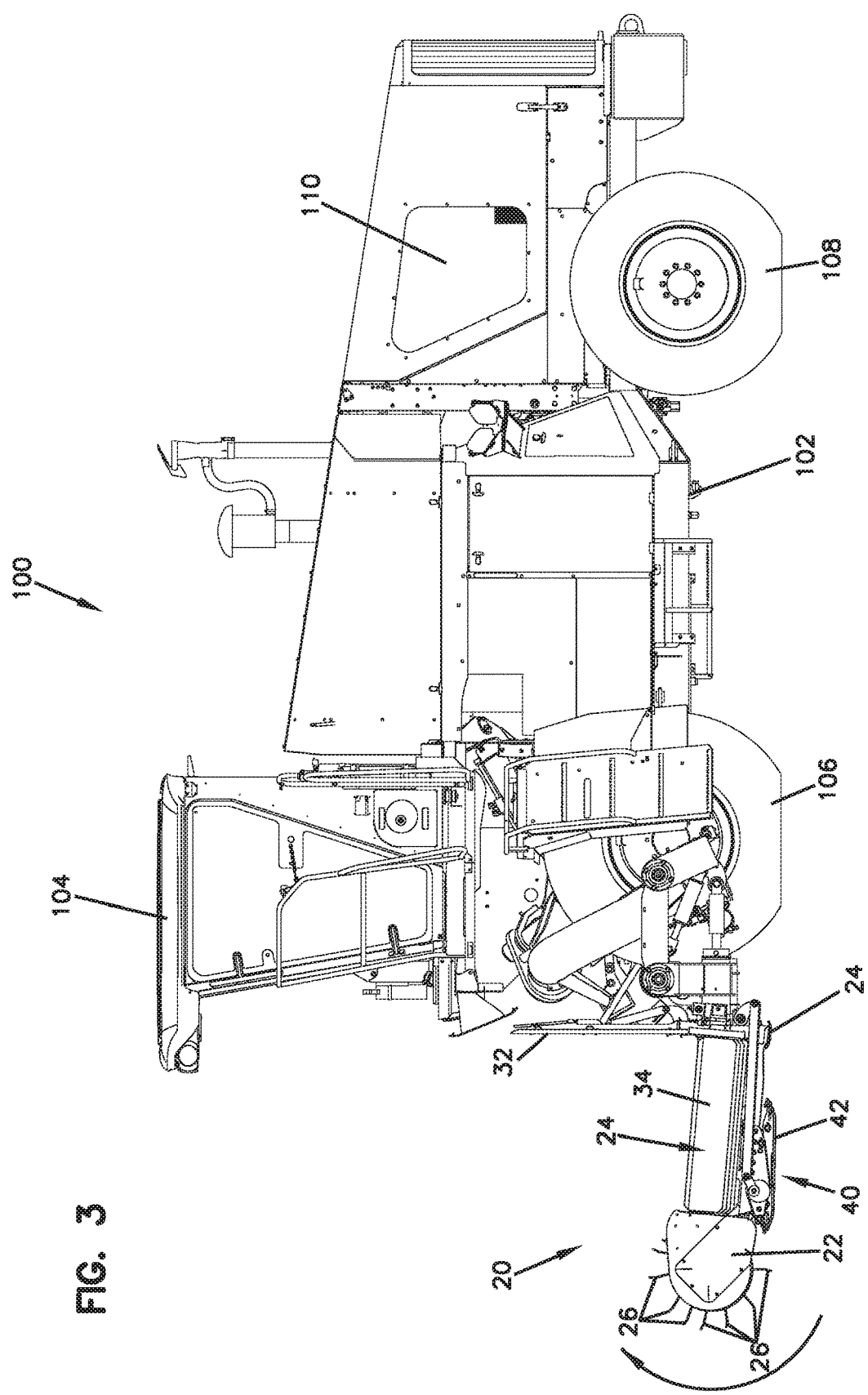
FIG. 3 is an end view of the merger shown in FIG. 1.

Referring now to the drawings and in particular to FIGS. 1-3, there is shown a merger apparatus, generally designated (100). In the embodiment shown, the merger apparatus (100) is a self-propelled merger. However, it can be appreciated that the principles of the present invention also apply to a tow-behind merger (200), such as shown in FIGS. 11-18. In the embodiments shown, the merger has three pickup and transfer assemblies (20). However, the present invention is also applicable to configurations with more or fewer pickup and transfer assemblies.

The merger apparatus (100) includes a chassis (102) and an operator cab (104) at a front of the chassis, and three pickup and transfer assemblies (20). The cab (104) includes the steering and the other controls for driving the merger and operating the pickup and transfer assemblies (20). In the embodiment shown, the merger chassis (102) is supported on front drive wheels (106) and rear wheels (108). The merger (100) includes a motor (110) placed at the rear of the chassis (102). The pickup and transfer assemblies (20) form a continuous lateral transport path at the front of the merger (100). The lateral transport path provides for merging hay and other materials into windrows for further processing or harvesting. The pickup and transfer assemblies (20) are foldable via a folding system (112) including curved arms for the outer pickup and transfer assemblies to reconfigure the merger (100) for transport, as shown in FIG. 2.

Figure 4:
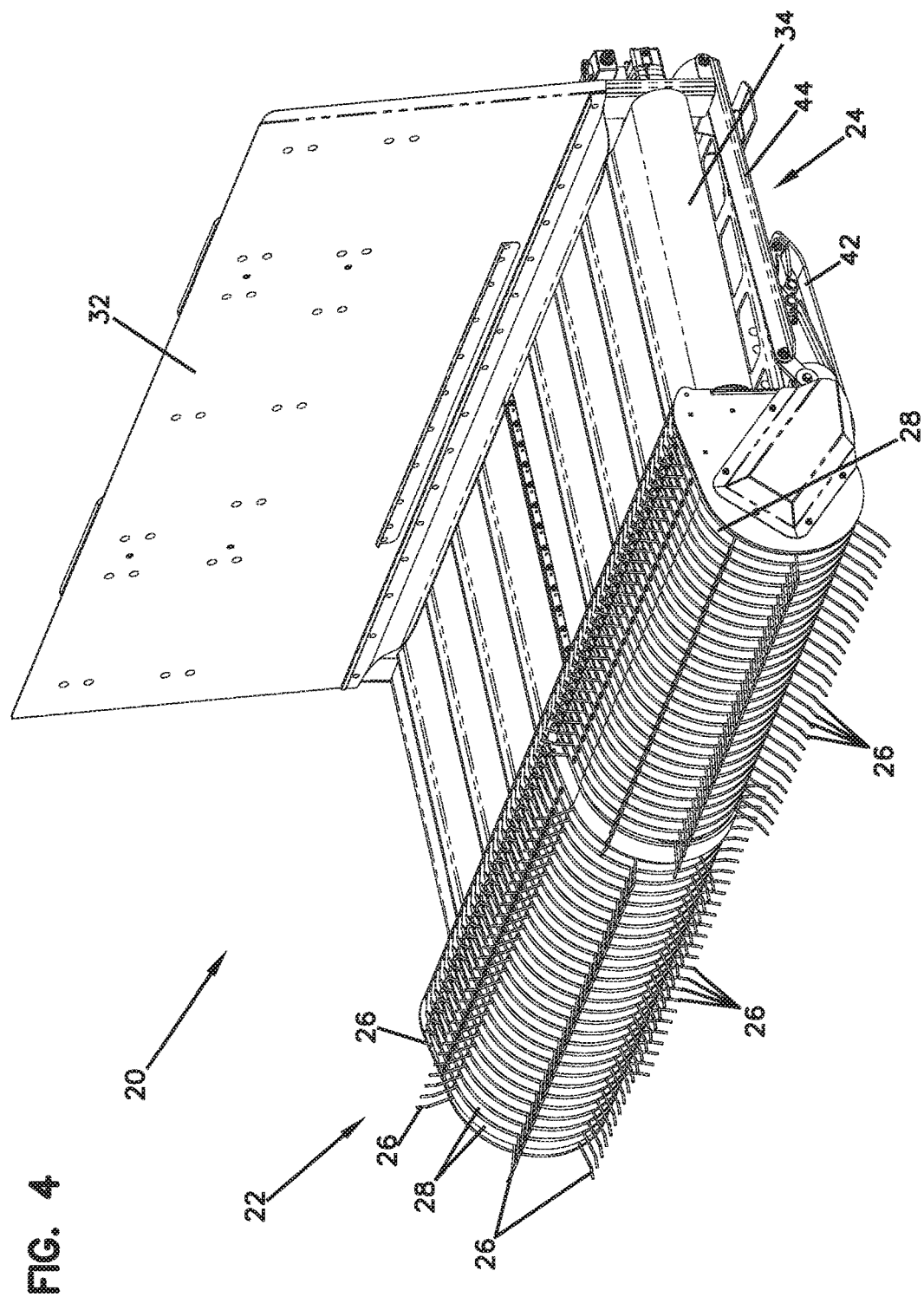
FIG. 4 is a perspective view of a pickup and transfer assembly for the merger shown in FIG. 1.
Figure 5:
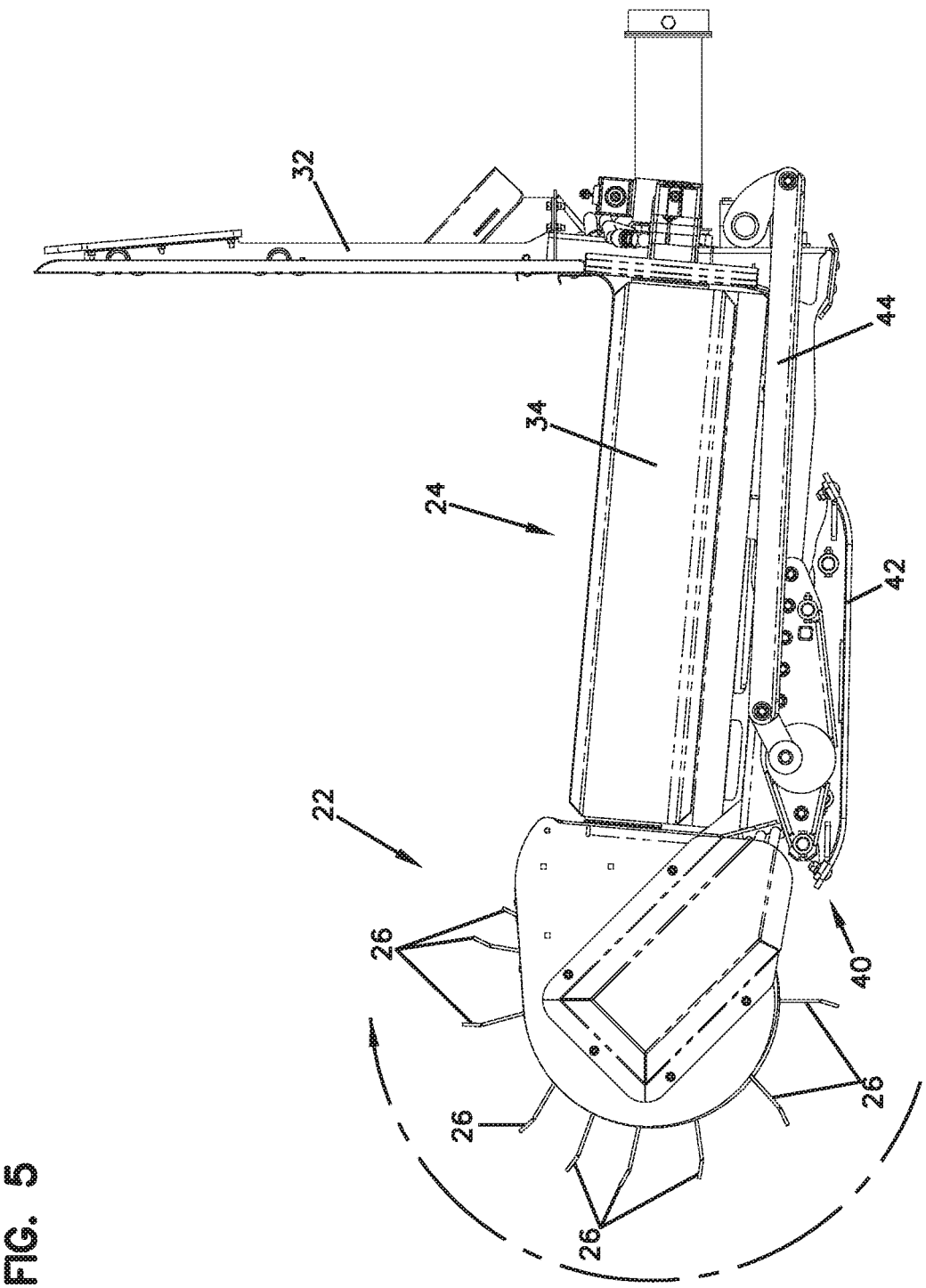
FIG. 5 is an end view of the pickup and transfer assembly shown in FIG. 4.

Each of the pickup and transfer assemblies (20), as also shown more clearly in FIGS. 4 and 5, include a material pickup assembly (22) and a conveyor assembly (24). The material pickup assembly (22) includes a multiplicity of rotating tines (26) extending generally radially outward and spaced about a periphery of the pickup assembly (22) and are also spaced laterally along each of the pickup and transfer assemblies (20). It can be appreciated that the tines (26) form a substantially continuous pickup path extending from opposite ends of the outermost pickup and transfer assemblies (20). Flexible laterally spaced apart guards (28) arc from below to above and around the front of the material pickup head (22). The tines rotate in slots formed between adjacent guards (28).

The conveyor assembly (24) of each pickup and transfer assembly (20) is positioned to the rear of the material pickup head (22) and includes a conveyor belt (34) and a shroud (32) to the rear of the conveyor belt (34) that folds between a raised position and a position against the belt (34). The conveyor belt (34) is reversible to deliver material transverse to the direction of travel. In the embodiment shown, the conveyor belt (34) has a widened configuration as compared to prior art mergers with a width of approximately 42 inches as compared to 35 inches for conventional mergers. However, other belt widths are also foreseen and would also work sufficiently. Moreover, the upper face of the belt (34) is angled slightly rearward such as 5 degrees downward. The rearward slant and the additional width increase capacity and help to prevent unwanted accumulations on the belt and more even distribution of materials.

Figure 8:
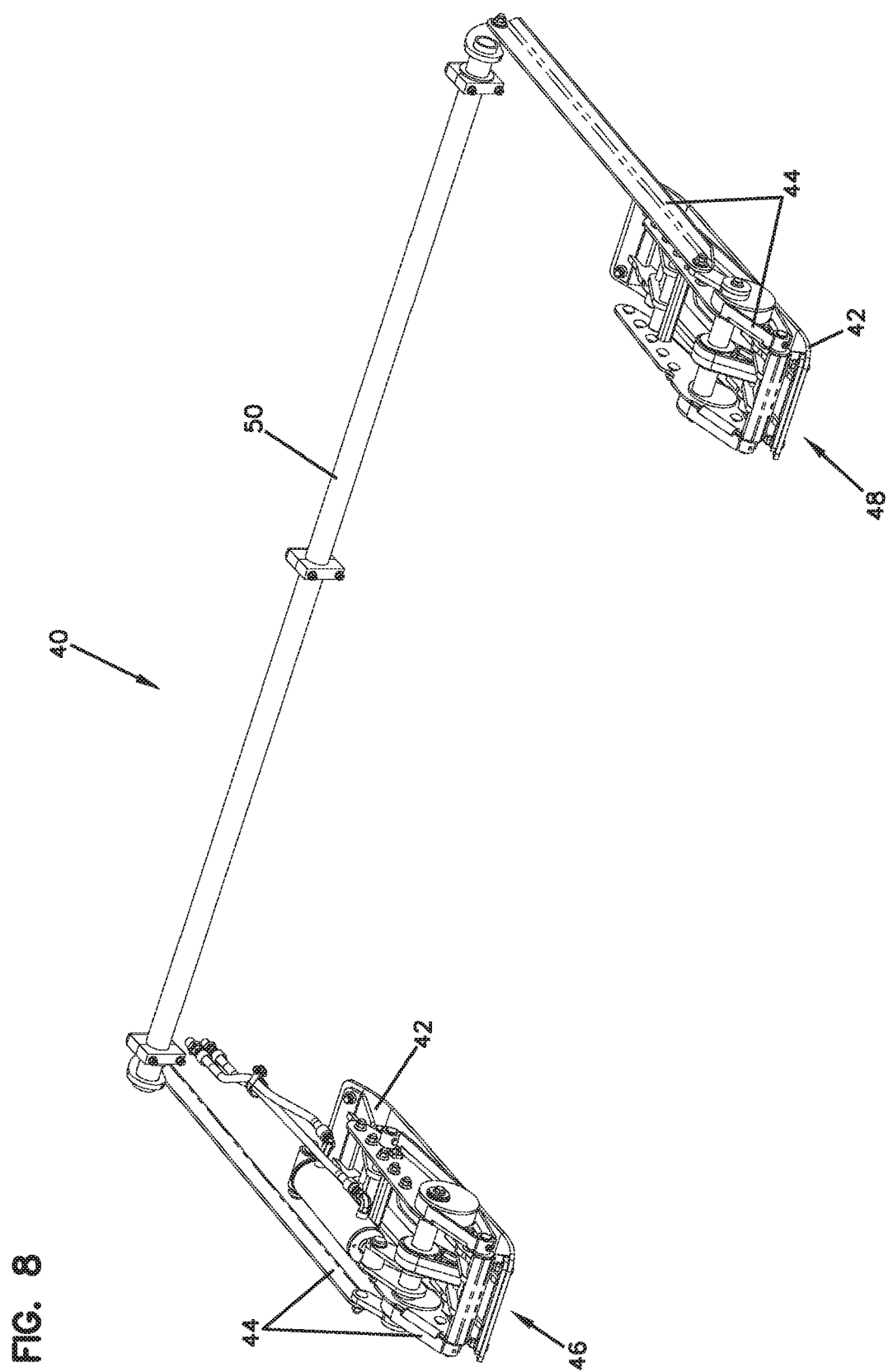
FIG. 8 is a perspective view of the skid and suspension assembly for the pickup and transfer assembly shown in FIG. 4.

Each of the pickup and transfer assemblies (20) is supported on a suspension system (40). The suspension system (40) includes skids (42), as also shown in FIG. 8. Each of the pickup and transfer assemblies (20) has a skid (46, 48) proximate each end. The suspension system (40) includes a linkage (44) providing for adjustment of the skids (46, 48) relative to the pickup and transfer assemblies (20) and also includes a link (50) connecting the master linkage and skid assembly (46) including a hydraulic cylinder to the slave skid assembly (48). The master/slave relationship provides for simplified adjustment of both skids while reducing the weight and cost.

Figure 9:
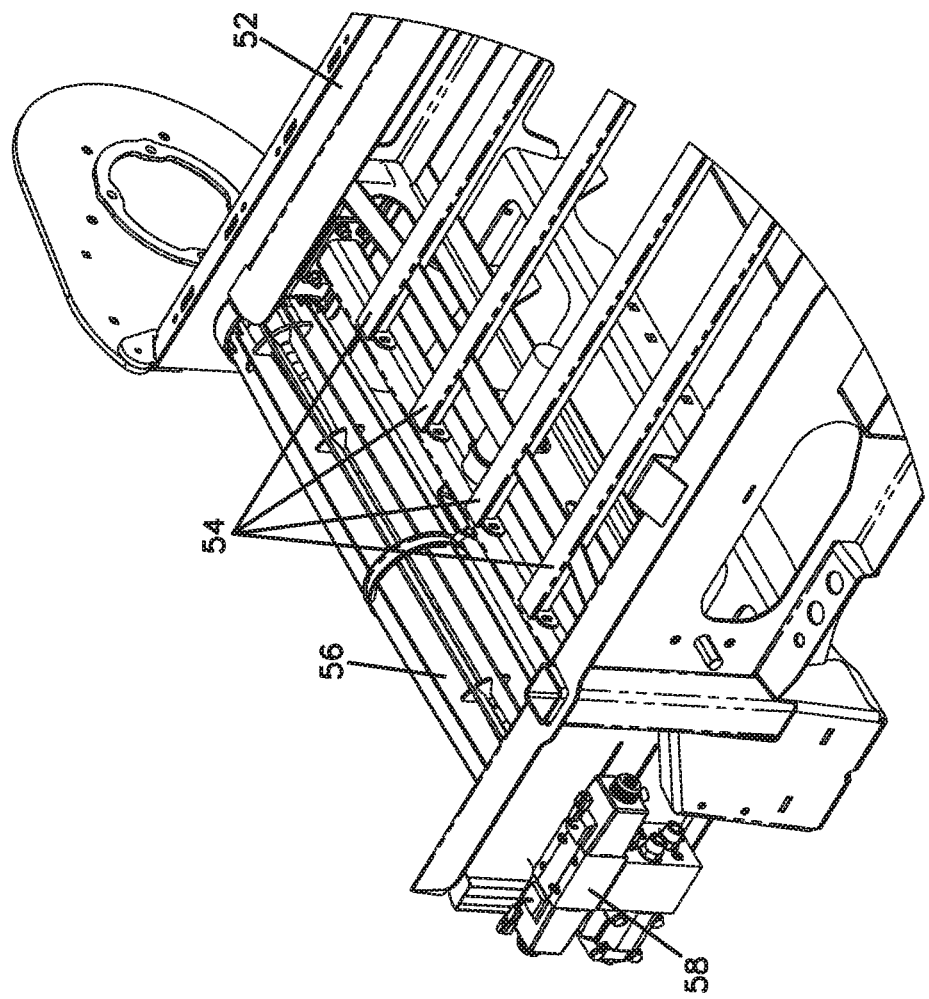
FIG. 9 is a perspective view of a frame and roller for the conveyor of the pickup and transfer assembly shown in FIG. 4.
Figure 10:
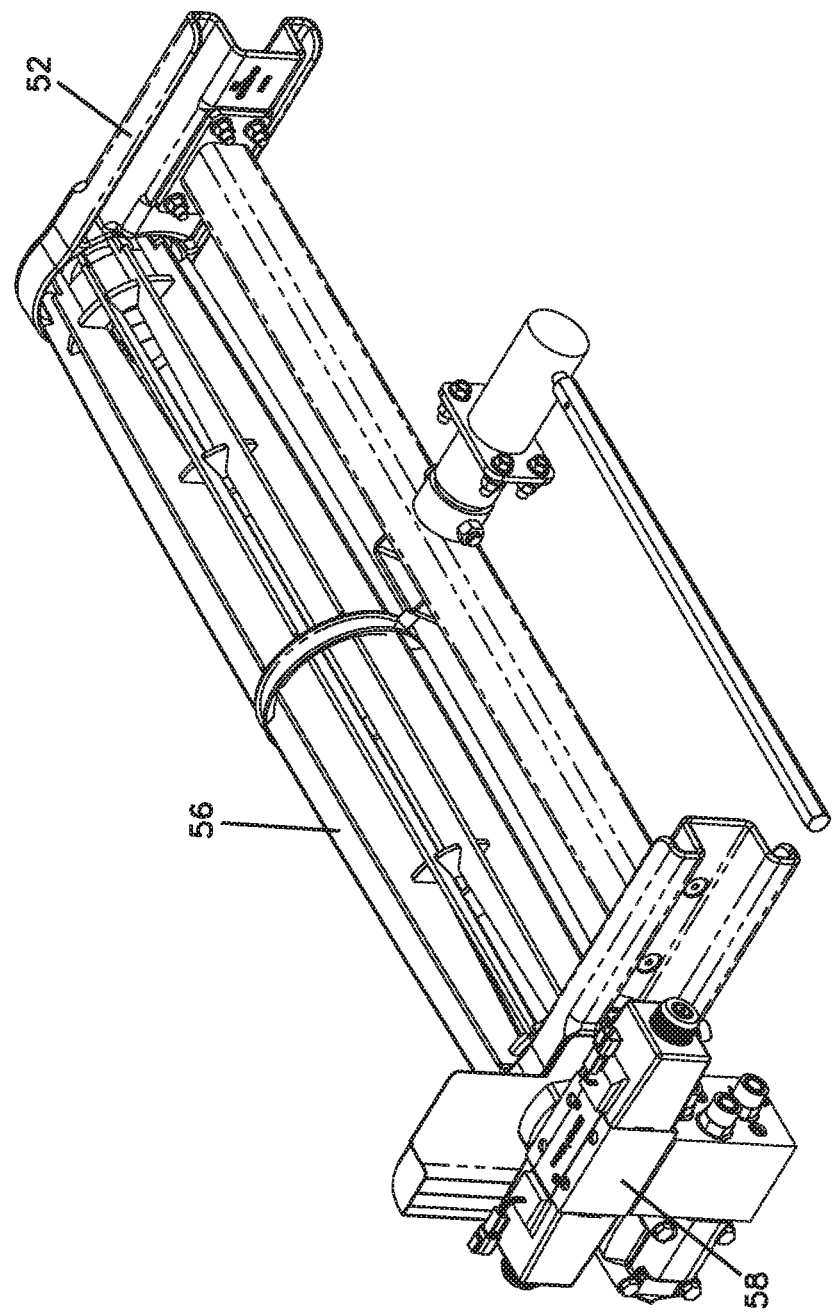
FIG. 10 is a top perspective detail view of the roller shown in FIG. 9.
Figure 11:
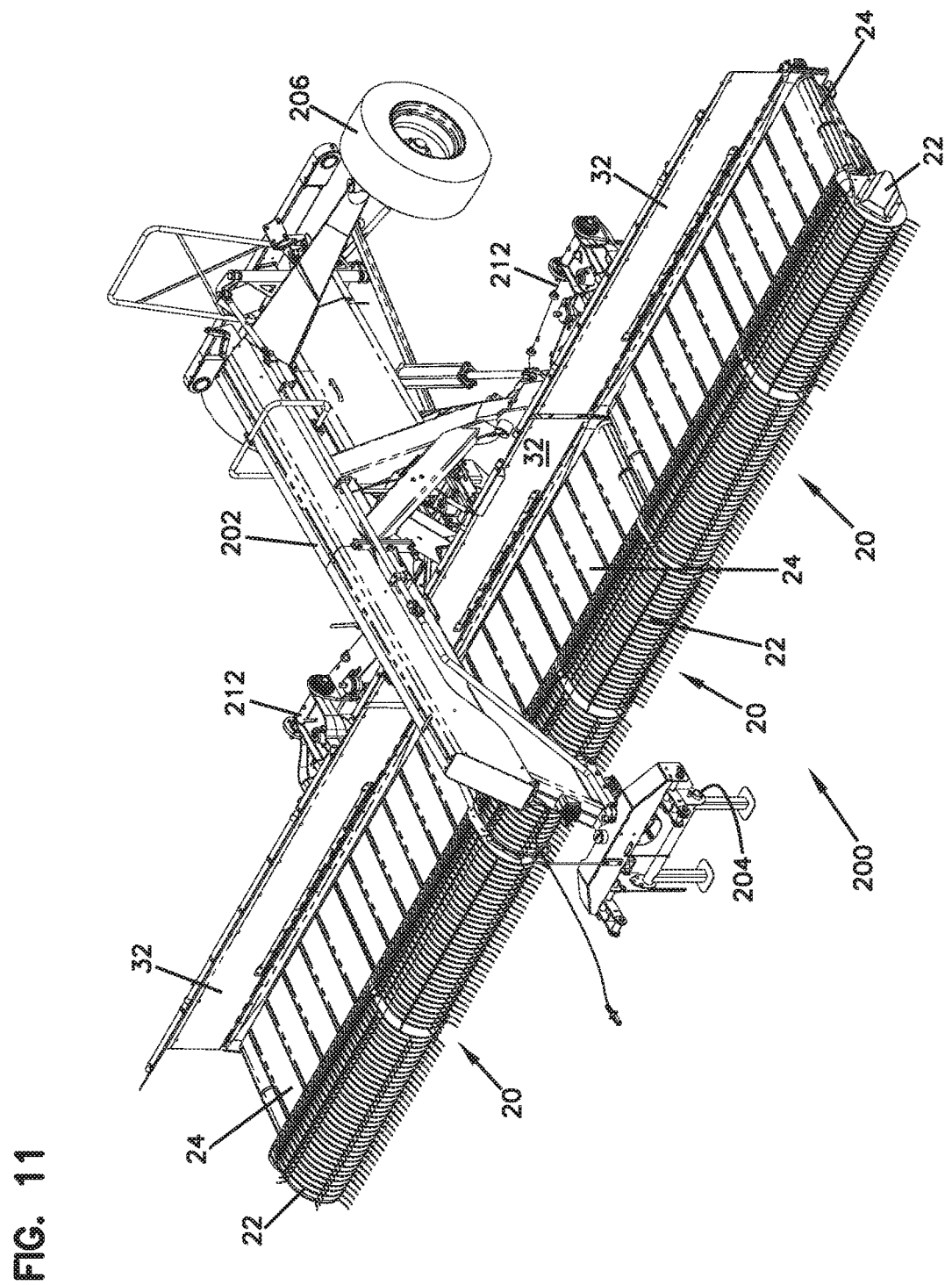
FIG. 11 is a perspective view of a second embodiment of a windrow merger according to the principles of the present invention.
Figure 12:
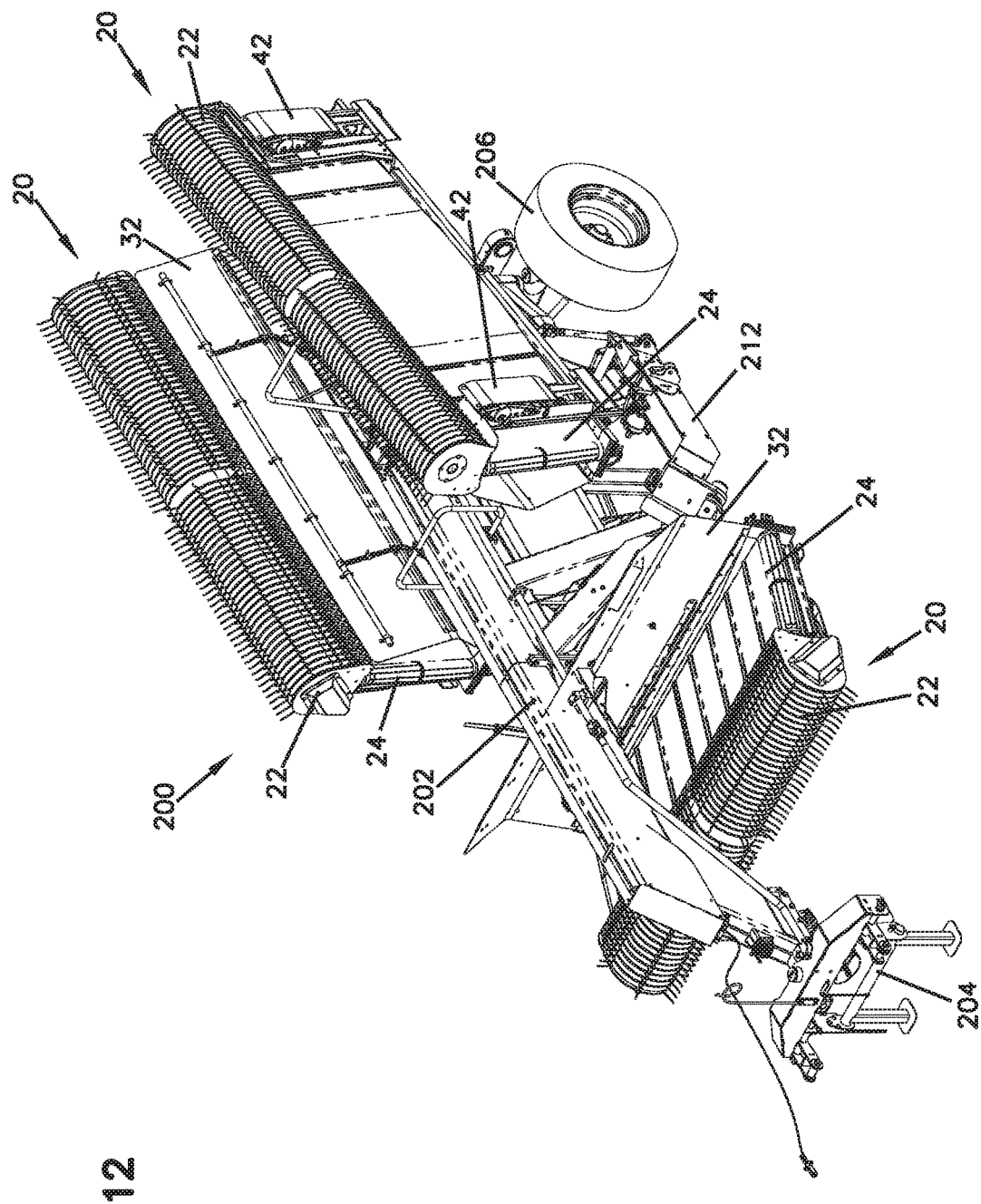
FIG. 12 is a perspective view of the windrow merger of FIG. 11 shown in a folded position.
Figure 13:
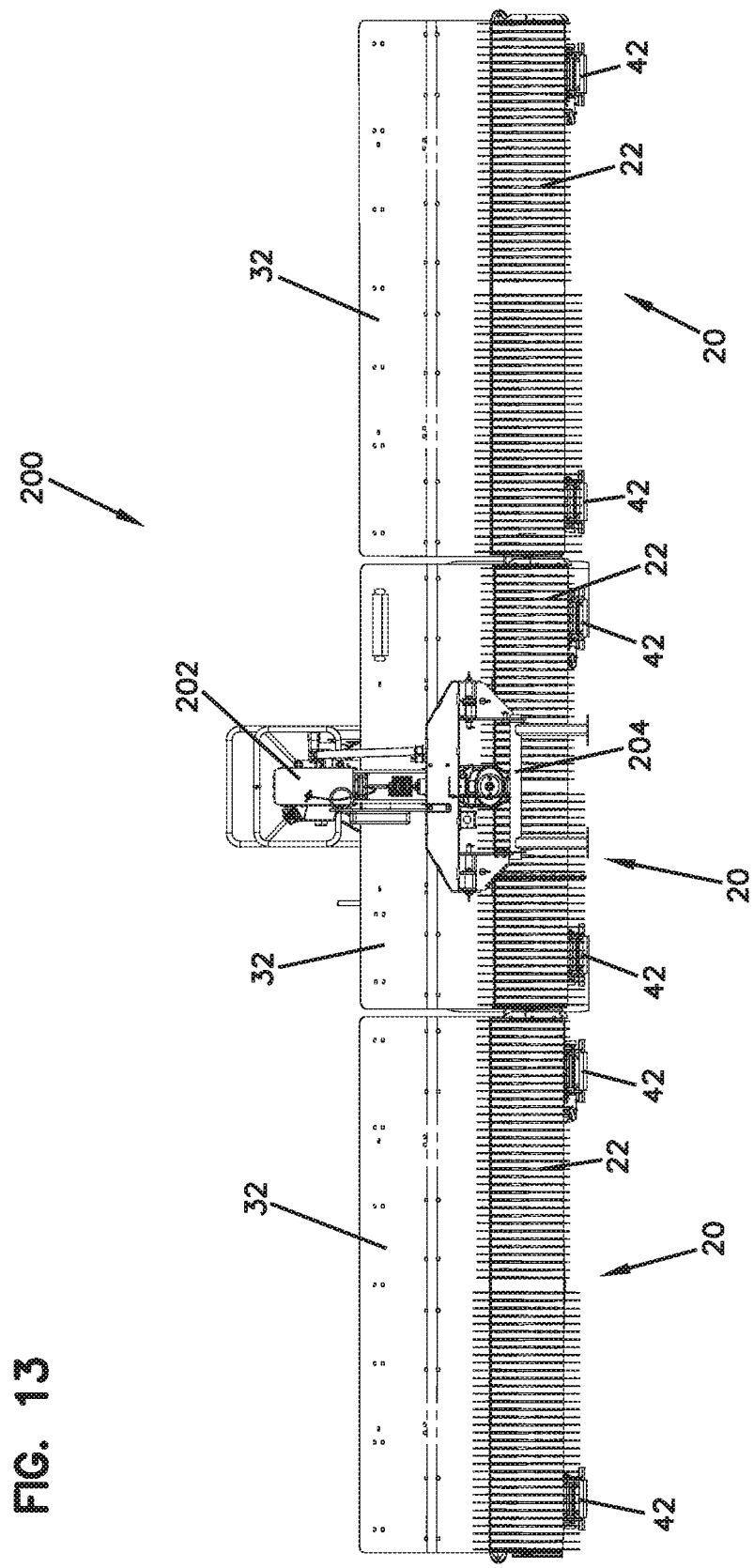
FIG. 13 is a front view of the windrow merger of FIG. 11.
Figure 14:
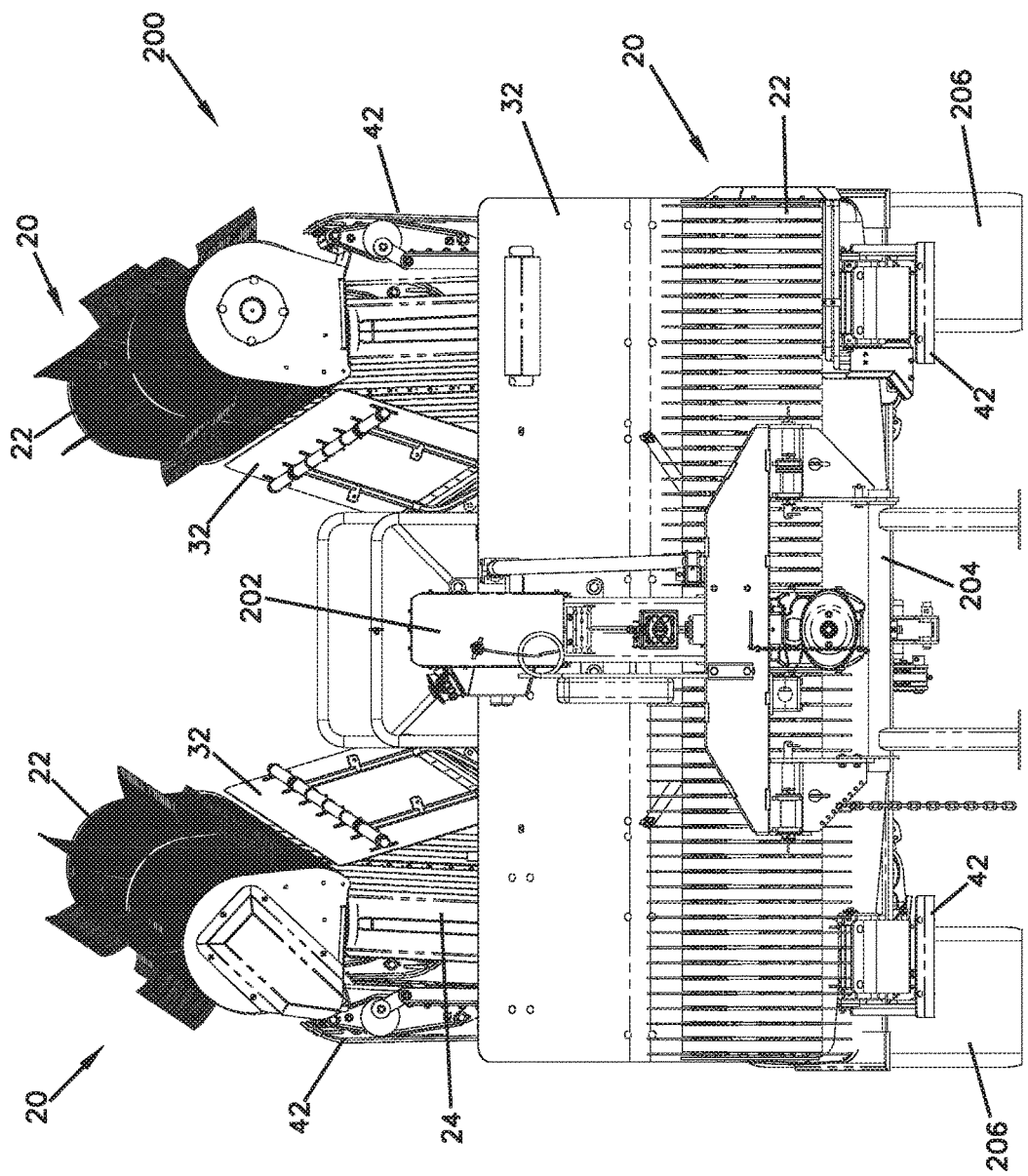
FIG. 14 is a front view of the windrow merger of FIG. 11 shown in a folded position.
Figure 15:
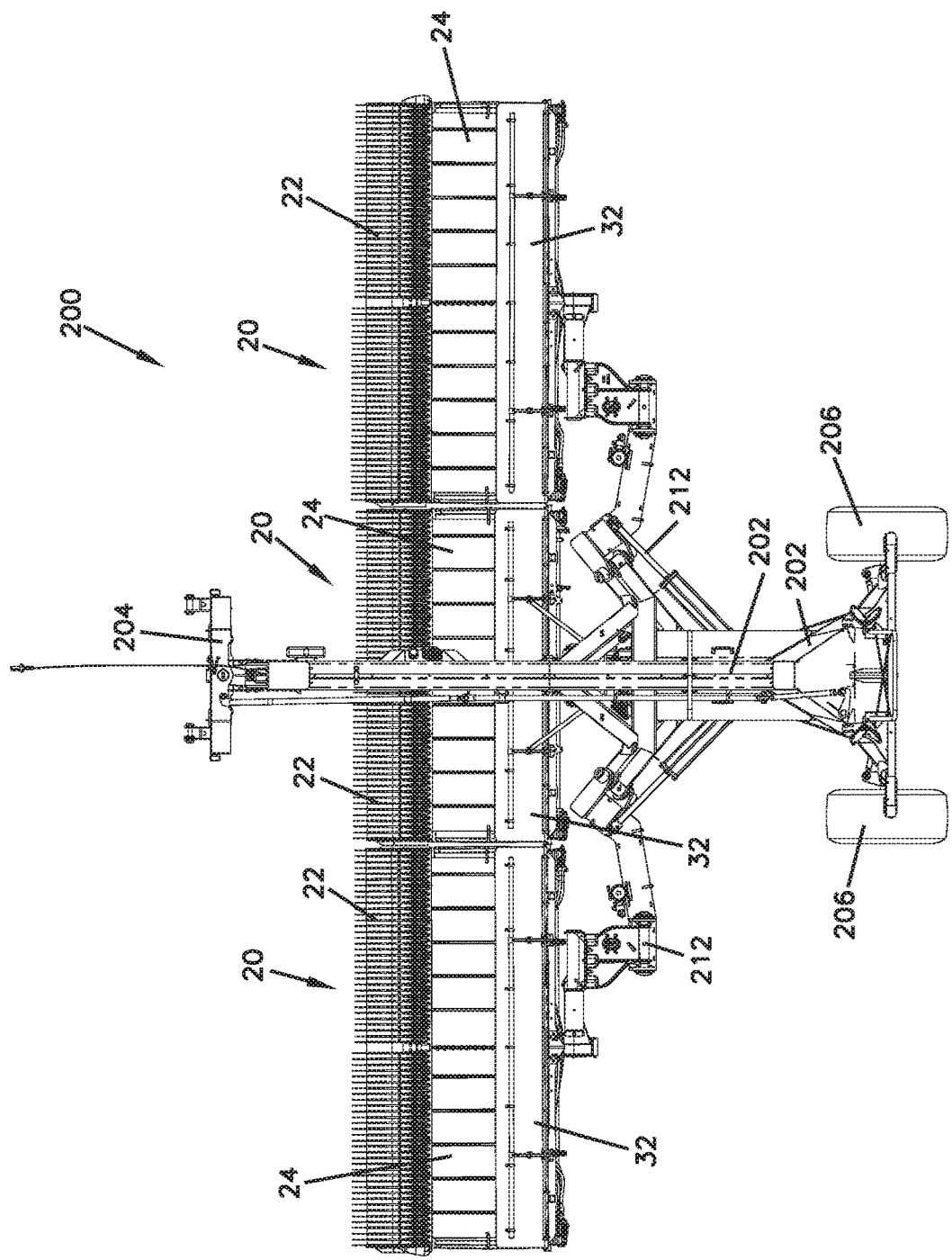
FIG. 15 is a top plan view of the windrow merger of FIG. 11.
Figure 16:
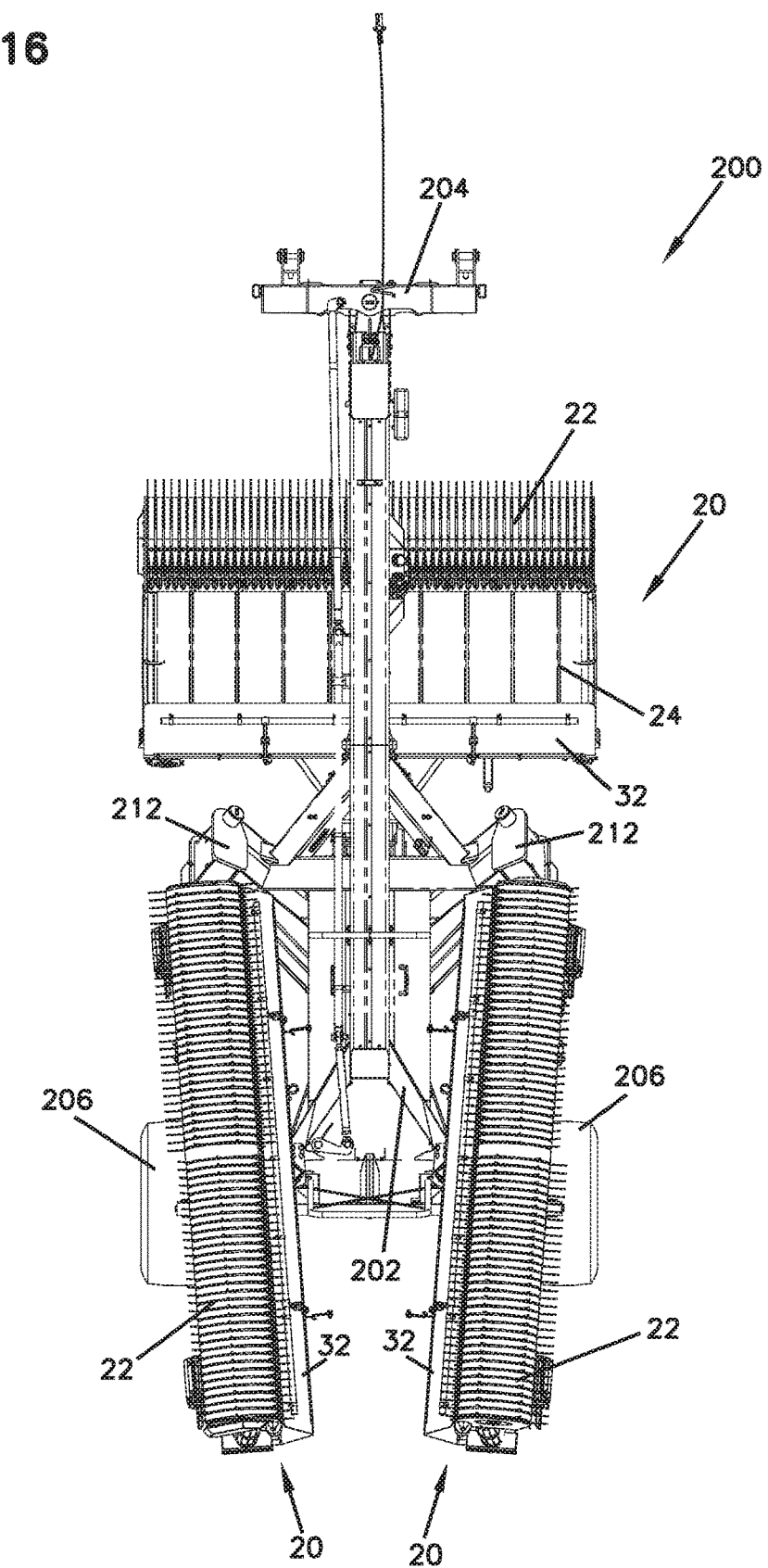
FIG. 16 is a top plan view of the windrow merger of FIG. 11 shown in a folded position.
Figure 17:
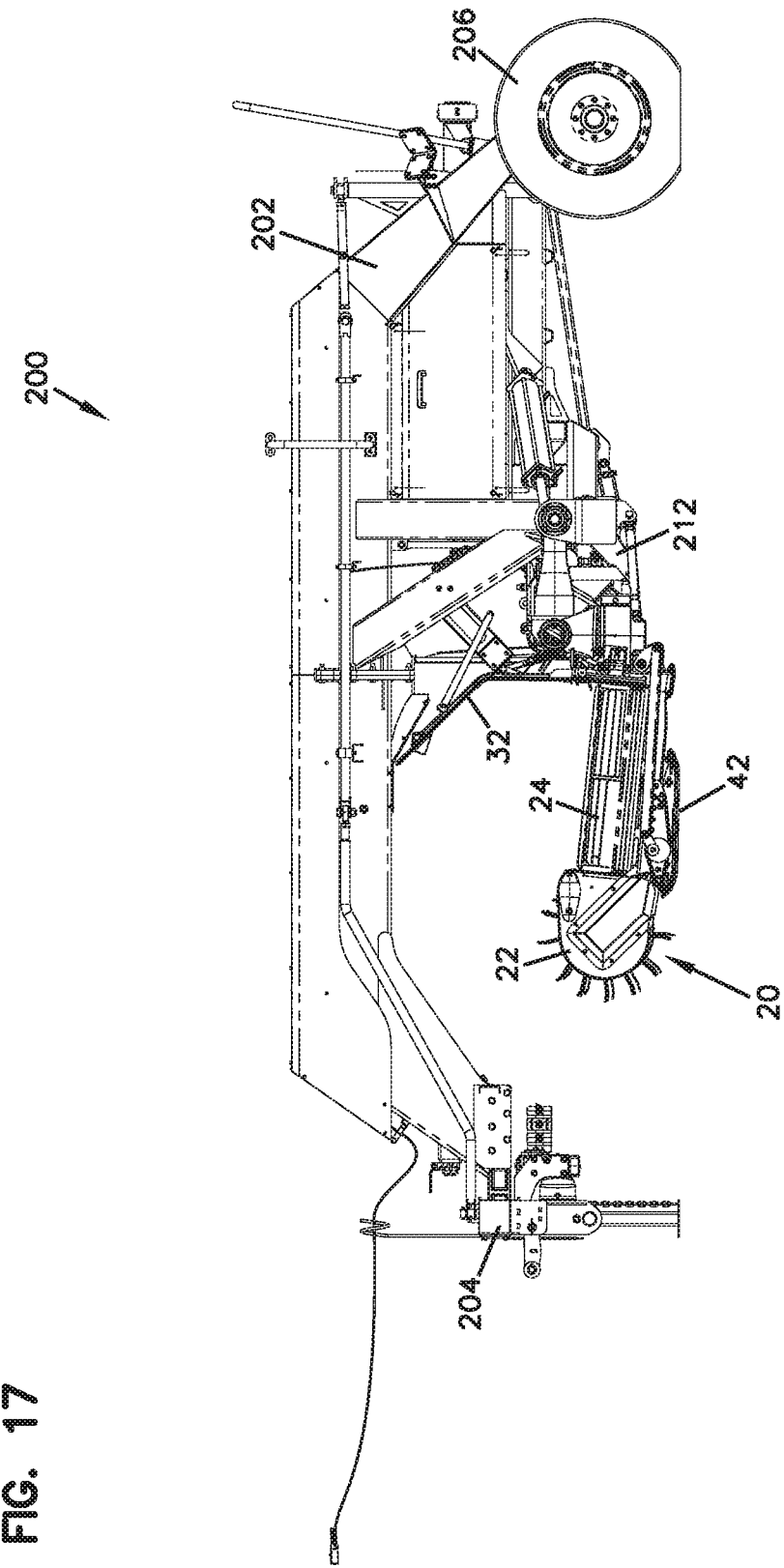
FIG. 17 is a side elevational view of the windrow merger of FIG. 11.
Figure 18:
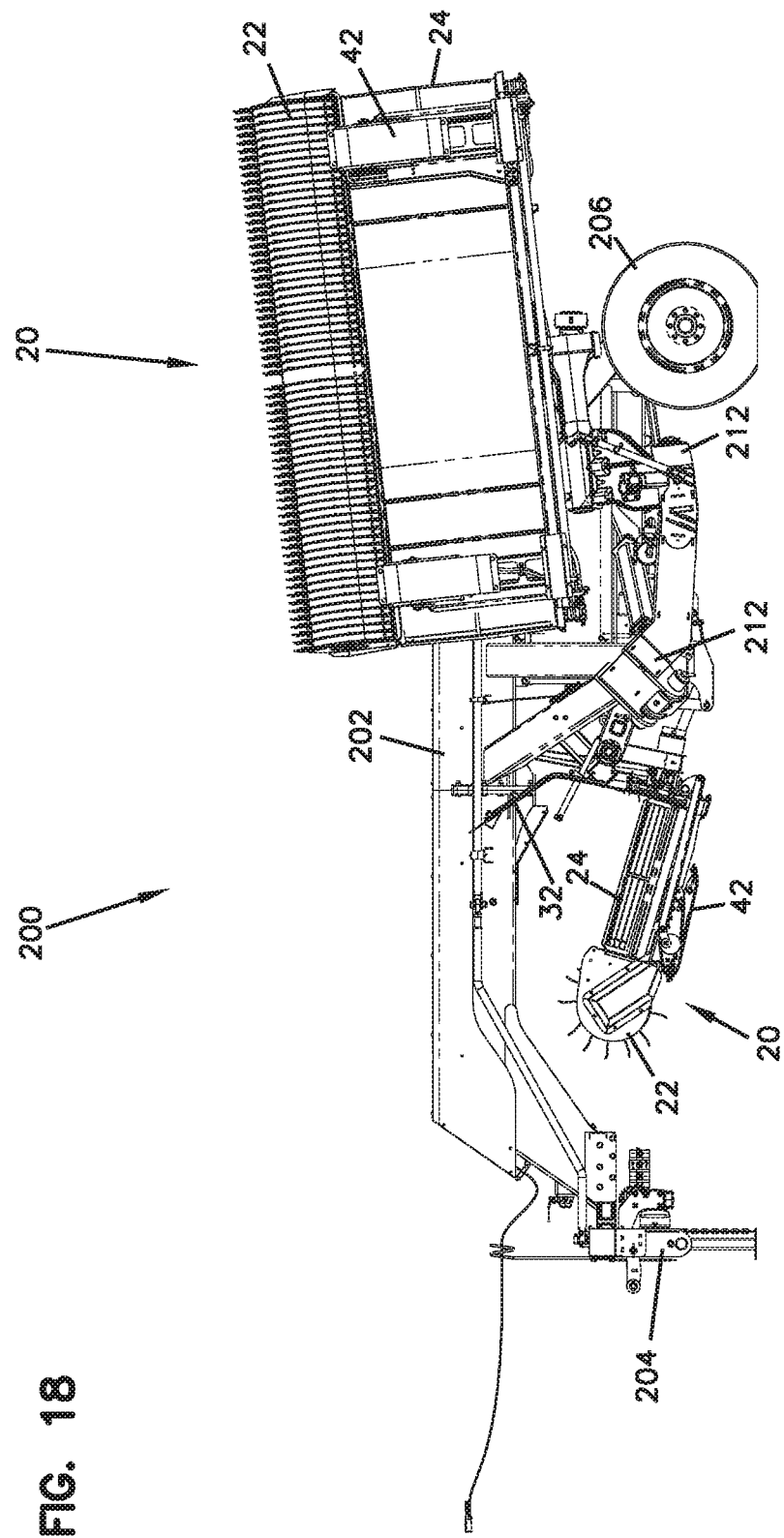
FIG. 18 is a side elevational view of the windrow merger of FIG. 11 shown in a folded position.

The conveyor (24) is supported on a frame (52) extending along the edges of the conveyor belt, as shown in FIGS. 9 and 10. Pulleys (56) are configured with radially outward extending slats and bulkheads but other configurations may also be utilized. A motor (58) powers the pulley and a tensioner may also be utilized. The conveyor belt slides over upper supports (54) that are angled slightly downward and rearward.

Figure 6:
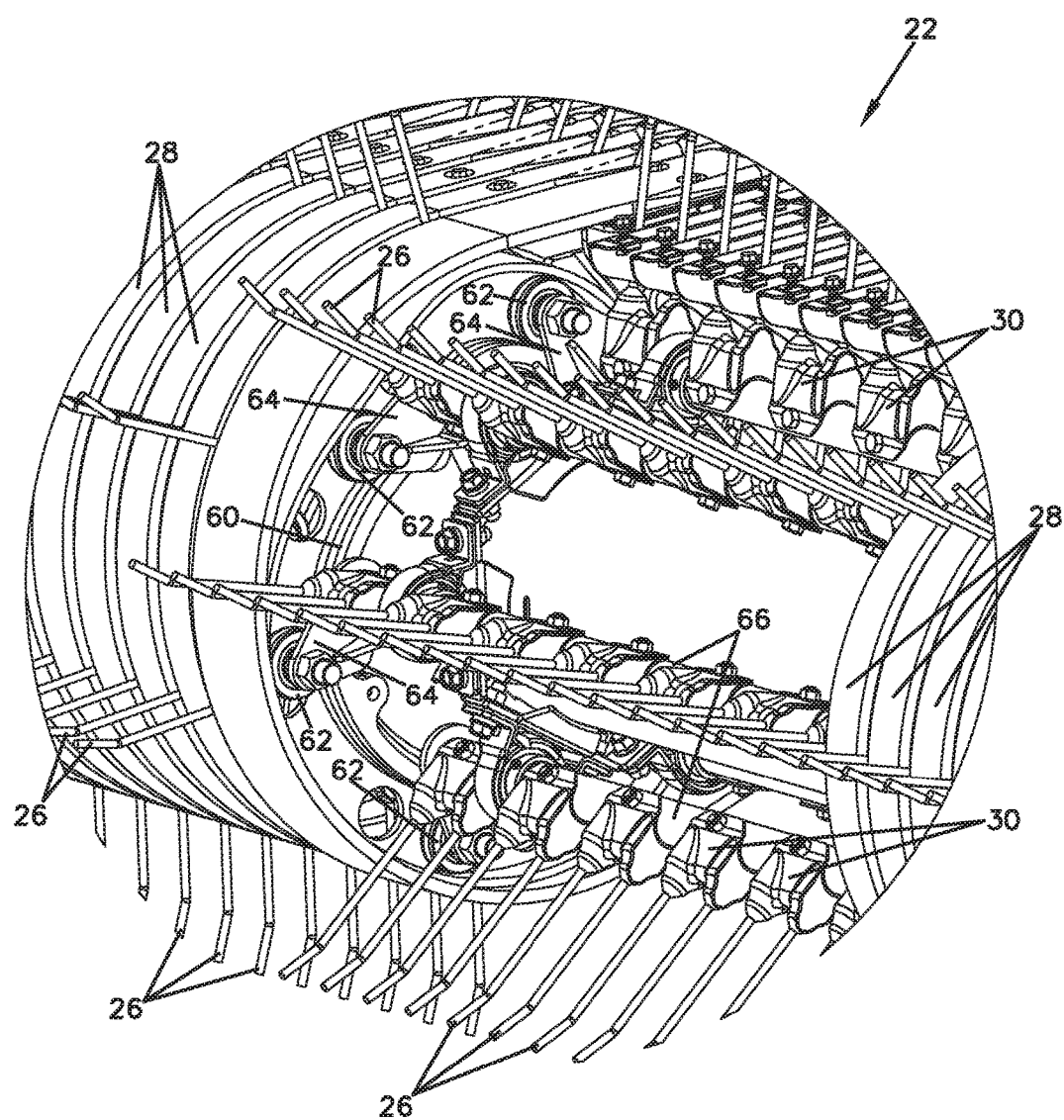
FIG. 6 is a perspective view of a portion of the pickup and transfer assembly shown in FIG. 4 with guards removed for clarity.
Figure 7:
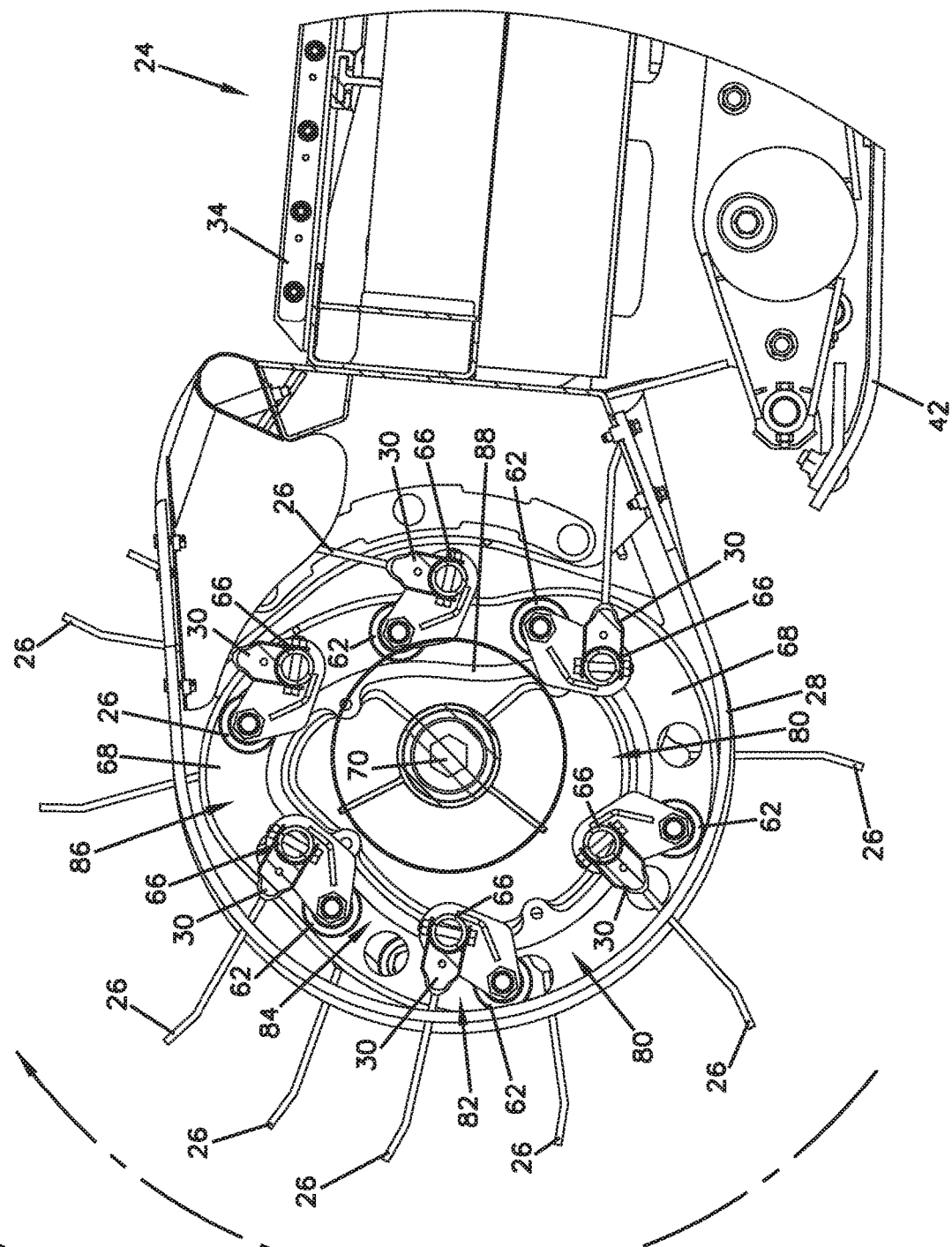
FIG. 7 is a side sectional view of a cam assembly for the pickup and transfer assembly shown in FIG. 4.

Referring now to FIGS. 6-7, a cam (60) is shown that controls the speed and improves the pickup performance of the tines (26). Cams (60) are positioned near the center of each of the pickup and transfer assemblies (20), each pickup and transfer assembly includes cam (60) defining two cam paths, one on each side and supporting bars (66) extending outward and longitudinally along the material pickup assembly (22). Alternatively, two cams each having a cam path could be used. The bar (66) supports the tines (26), which are mounted on tine mounts (30). In the embodiment shown, each tine mount (30) includes a pair of tines (26). The tine mounts (30) simply bolt onto the longitudinally extending bar (66). In the embodiment shown, the guards (28) mount in sections to allow access to sets of multiple tines (26) for easier replacement should damage occur. It can also be appreciated that the tines (26) are shown with a slightly bent end portion that extends slightly toward the direction of rotation. In the configuration shown in FIG. 7, the merger moves in a travel direction to the left of the pickup and transfer assembly. The tines (26) are driven to rotate in a clockwise configuration about an axis of rotation (70). Therefore, the bent portions are moving towards the direction of rotation. Moreover, the tines (26) are moving upward at the front portion of the material pickup assembly (22).

As shown most clearly in FIGS. 6 and 7, the cam (60) is engaged by rollers (62). The rollers (62) move about the periphery of the cam (60) in a channel (68). The cam (60) has an uneven surface upon which the rollers (62) move with the radial distance from the center of rotation (70) varying at different sections around the periphery of the cam (60). The rotational speed of the pickup assembly is constant, but the actual speed of the rollers (62) varies as the radial distance of the rollers (62) varies and they move further away and closer to the axis of rotation (70). Therefore, at portions where the cam surface extends further away in a direction away from the rotational axis (70), the speed of the roller following the cam accelerates. At portions where the cam surface transitions to a distance closer to the rotational axis (70), the speed of the roller following the cam decelerates. Moreover, where the radial distance from the rotational axis (70) is greater, the speed of the rollers is faster and where the radial distance is less, the speed is slower. Therefore, although the rotational speed at which the material pickup head is driven remains constant, as the distance from channel (68) to the axis of rotation varies around the cam (60), the actual speed of the tines (26) varies at different points around the cam (60).

The rollers (62) are supported on tabs (64) that connect to the bars (66). The tabs (64) provide for angling the bars (66) relative to the rollers (62) so that the angle of the tines (26) is optimized. It can be appreciated that the particular angle may be adjusted. In the embodiment shown, the tab (64) is at an angle of approximately 60 degrees relative to the orientation of the tine (26), but other angles may also provide satisfactory results.

The cam (60) forms different sections along its surface and for the channel (68). A first lower section of the cam (80) has a first radial distance to the center of rotation (70). Therefore, the speed of the rollers (62) and therefore the tines (26) is constant at the lower section (80). This decreased speed of the tines (26) when picking up material reduces the forward motion of the material and improves material flow. Moreover, reduced speed is gentler on the material being lifted from the field and decreases damage to the material and reduces loss of nutrient value. At the front portion of the cam (60) is a second transition section (82). After the rollers would reach this point, the radial distance to the center of rotation (70) of the cam surface begins to decrease. Therefore, the roller speed begins to decelerate. After passing beyond the transition section (82), the rollers engage an outer section of the cam periphery having an increasing radius. Therefore, the speed of the tines accelerates. As the rollers (62) travel to the top of the travel path of the periphery of the cam (60), the radial distance to the center of rotation (70) increases to a maximum at a top section (86). The acceleration of the tines (26) is sufficient to propel the material rearward with enough force to propel material picked up from the field to the rear of the conveyor belt (24). The rollers (62) then continue to travel along the periphery of the cam (60) at a rear section (88). In the embodiment shown, the rear section (88) has a concave shape that occupies less space.

With the cam configuration shown, the present invention is able to operate at a higher speed while achieving a gentler pickup of material due to lower tine speed at the point of pickup and also achieves a greater spread with material dispersed more evenly on the belt due to the higher speed and acceleration of the tines (26) as they reach a point where the material is propelled rearward. The angle of the tines (26) is also optimized to pick up a greater percentage of material from the field while leaving rocks, dirt and other debris. Moreover, with the upper surface of the conveyor belt (34) being angled slightly downward toward the rear, a greater spread is obtained and there is less gathering of material at the front of the conveyor belt and more even spreading of material into windrows leading to achieving greater capacity even at lower speeds.

Referring now to FIGS. 11-18, the towable windrow merger apparatus, generally designated (200) is shown. The tow behind merger (200) also includes three pickup and transfer assemblies (20) that generally include the same components including the cams as in the pickup and transfer assemblies (20) of the self-propelled merger (100). The merger (200) includes a frame (202) mounted on wheels (206). A hitch (204) is configured for attachment to a towing vehicle, such as a tractor. As the pickup and transfer assemblies (20) of the tow behind merger (200) do not need to pass over a wheel and do not need to be rear of a cab when folded, the folding path differs from the path of the self-propelled merger (100).

Each of the pickup and transfer assemblies (20) of the tow behind windrow merger (200) includes a material pickup assembly (22) and a conveyor assembly (24). Each pickup and transfer assembly includes a folding shroud (32). It can be appreciated that the shroud (32) on the outer pickup and transfer assemblies (20) folds generally against the conveyor assembly (24). The center pickup and transfer assembly (20) generally lifts up as shown in FIGS. 12, 14, 16 and 18 in the folded position. The outer pickup and transfer assemblies fold on linkages (212) upward and rearward with the material pickup assembly (22) and the conveyor assembly (24) extending generally along a direction of travel. The pickup and transfer assemblies (20) are each supported on skids (42) with a suspension system (40) shown in FIG. 8.

Each of the pickup and transfer assemblies (20) of the towable windrow merger (200) also includes a cam (60) shown in FIGS. 6-7 to control the movement and speed of the tines of the material pickup assembly (22) for improved material pickup. It is appreciated that the pickup and transfer assemblies (20) are substantially identical and may be interchanged, which also provides for having a spare pickup and transfer assembly (20) that may be interchanged with any of the assemblies (20).

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A windrow merger having a front and a rear and configured for moving along a direction of travel, the merger comprising:
   a frame;
   a head;
   the head comprising a pickup assembly, the pickup assembly comprising:
   a plurality of tines rotating about a rotational axis extending transverse to the direction of travel spaced along and around a periphery of the head and extending radially outward;
   a cam defining a cam surface, the cam surface comprising:
      a first portion proximate a lower front portion of the cam and at a first distance from the rotational axis for imparting a first tine speed for tines passing over the first portion;
      a second portion proximate an upper front and top portion of the cam and at a second distance from the rotational axis for imparting a second tine speed for tines passing over the second portion, the second tine speed being greater than the first tine speed;
   a plurality of tabs, and a roller associated with each of the tabs, the tabs being spaced apart around a periphery of the cam and engaging the cam surface;
   a plurality of transverse extending bars mounted to the rollers and supporting the plurality of tines spaced apart along each of the bars, wherein the tines are directed vertically downward when passing a position directly below the rotational axis and the tines are directed above horizontal when passing a position directly in front of the rotational axis; and
   a conveyor rear of the plurality of tines.

2. A windrow merger according to claim 1, wherein the conveyor comprises a belt conveyer moving in a direction transverse to the direction of travel, the belt having an upper surface angled downward to the rear away from the direction of travel.

3. A windrow merger according to claim 2, wherein the belt is angled downward to the rear at about 5 degrees.

4. A windrow merger according to claim 1, wherein the cam comprises a transition portion from the first portion to the second portion, wherein the radial distance of the cam surface from the rotational axis decreases from the first portion to the second portion.

5. A windrow merger according to claim 1, the cam being positioned at an intermediate portion of the head and having tines extending transversely on either side of the cam.

6. A windrow merger according to claim 1, wherein the cam surface includes a convex portion at the rear of the cam extending radially inward.

7. A windrow merger according to claim 1, wherein the merger comprises a plurality of the heads.

8. A windrow merger according to claim 7, wherein the plurality of heads fold.

9. A windrow merger according to claim 7, wherein the merger comprises a self-propelled merger.

10. A windrow merger according to claim 7, wherein the merger comprises a towable merger.

11. A windrow merger according to claim 1, further comprising a suspension assembly, wherein the suspension assembly comprises a master linkage and skid assembly and a slave skid assembly.

12. A pickup head for picking up material in a field comprising:
   a pickup assembly, the pickup assembly comprising:
   a plurality of tines rotating about a rotational axis extending transverse to a direction of travel spaced laterally along the head and extending radially outward;
   a cam defining a cam surface, the cam surface comprising:
      a first portion proximate a lower front portion of the cam and at a first distance from the rotational axis for imparting a first tine speed for tines passing over the first portion;
      a second portion proximate an upper front and top portion of the cam at a second distance from the rotational axis for imparting a second tine speed for tines passing over the second portion, the second tine speed being greater than the first tine speed;
   a plurality of tabs, and a roller associated with each of the tabs, the tabs being spaced apart around a periphery of the cam and engaging the cam surface;
   a plurality of transverse extending bars mounted to the rollers and supporting the plurality of tines spaced apart along each of the bars; wherein the tines are directed vertically downward when passing a position directly below the rotational axis and the tines are directed above horizontal when passing a position directly in front of the rotational axis; and
   a conveyor rear of the plurality of tines.

13. A pickup head according to claim 12, wherein the conveyor comprises a belt conveyer moving in a direction transverse to the direction of travel, the belt having an upper surface angled downward to the rear away from the direction of travel.

14. A pickup head according to claim 13, wherein the belt is angled downward to the rear at about 5 degrees.

15. A pickup head according to claim 12, wherein the cam comprises a transition portion from the first portion to the second portion, wherein the radial distance of the cam surface from the rotational axis decreases from the first portion to the second portion.

16. A pickup head according to claim 12, the cam being positioned at an intermediate portion of the head and having tines extending transversely on either side of the cam.

17. A pickup head according to claim 12, wherein the cam surface includes a convex portion at the rear of the cam extending radially inward.

18. A pickup head according to claim 12, further comprising a suspension assembly, wherein the suspension assembly comprises a master linkage and skid assembly and a slave skid assembly.

* * * * *